(12) United States Patent  (10) Patent No.: US 7,907,229 B2
Hayashi et al.  (45) Date of Patent: Mar. 15, 2011

(54) PLANAR DISPLAY DEVICE

(75) Inventors: Shunichiro Hayashi, Fukaya (JP); Atsushi Hirota, Kumagaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 981 days.

(21) Appl. No.: 11/620,281

(22) Filed: Jan. 5, 2007

(65) Prior Publication Data

US 2007/0165153 A1  Jul. 19, 2007

(30) Foreign Application Priority Data

Jan. 19, 2006  (JP) ................................. 2006-011439

(51) Int. Cl.
    *G02F 1/1333* (2006.01)
(52) U.S. Cl. ......................................................... 349/58
(58) Field of Classification Search ........................ None
    See application file for complete search history.

(56) References Cited

U.S. PATENT DOCUMENTS

| 5,216,411 | A  | * | 6/1993 | Ashitomi et al. ............. 345/168 |
| 6,445,574 | B1 | * | 9/2002 | Saw et al. ................. 361/679.04 |
| 2003/0117324 | A1 | * | 6/2003 | Iwai et al. ..................... 343/702 |
| 2004/0136155 | A1 | * | 7/2004 | Onishi et al. .................. 361/683 |
| 2004/0263759 | A1 |   | 12/2004 | Matsuhira et al. |
| 2007/0164923 | A1 | * | 7/2007 | Kanai et al. ..................... 345/1.1 |
| 2009/0225239 | A1 | * | 9/2009 | Osada et al. .................. 348/841 |

FOREIGN PATENT DOCUMENTS

JP  2004-362877  12/2004

* cited by examiner

*Primary Examiner* — David Nelms
*Assistant Examiner* — Lucy P Chien
(74) *Attorney, Agent, or Firm* — Oblon, Spivak, McClelland, Maier & Neustadt, L.L.P.

(57) ABSTRACT

A main liquid crystal display panel is attached to a frame, and a sub liquid crystal display panel is attached to a bezel. The frame and the bezel are assembled to each other so that the main liquid crystal display panel and the sub liquid crystal display panel are arranged and held so as to face opposite sides. The frame and the bezel are separated from each other, whereby each of the liquid crystal display panels and can be easily separated at every part of the frame and the bezel.

6 Claims, 1 Drawing Sheet

PLANAR DISPLAY DEVICE

INCORPORATION BY REFERENCE

The present invention claims priority under 35 U.S.C. §119 to Japanese Patent Application No. 2006-011439 filed on Jan. 19, 2006. The content of the application is incorporated herein by reference in its entirety.

FIELD OF THE INVENTION

The present invention relates to a planar display device having a first planar display panel and a second planar display panel that are arranged so as to face opposite directions.

BACKGROUND OF THE INVENTION

Conventionally, for example, as described in Japanese Laid-Open Patent Publication No. 2004-362877, a liquid crystal display device as a planar display device used for a cellular phone or the like is equipped with two main and sub liquid crystal display panels as planar display panels arranged on both sides of a housing and carry out display, and a backlight as a planar light source body for illuminating light to the main and sub liquid crystal display panels is disposed between the main and sub liquid crystal display panels which are arranged back to back.

In the liquid crystal display device using the two main and sub liquid crystal display panels as described above, an optical guiding member, an optical sheet, etc., of the backlight are disposed inside one frame of synthetic resin, the main liquid crystal display panel is adhesively fixed to one surface side of the frame by a double-sided adhesive member or the like, and the sub liquid crystal display panel is adhesively fixed to the other surface side of the frame by a double-side adhesive member or the like.

There is a case where the liquid crystal display device is disassembled for repair or recovery. When only one liquid crystal display panel is adhesively fixed to the frame, the liquid crystal display device can be easily disassembled by peeling off the liquid crystal display panel while elastically deforming the frame.

However, in a case where two liquid crystal display panels are adhesively fixed to both surfaces of the frame, even when the frame is elastically deformed to peel off one liquid crystal display panel, the other liquid crystal display panel prevents the elastic deformation of the frame by the strength of the glass constituting the display panel concerned. Accordingly, this type of liquid crystal display device has a problem that it is hardly disassembled and an unreasonable load is applied on the other liquid crystal display panel during work, so that the liquid crystal display panel concerned is easily broken.

Furthermore, in the case of a main and sub integral type liquid crystal display panel in which a main and sub liquid crystal display panels are continuously connected to each other through a flat cable such as an FPC (Flexible Print Circuit) or the like, the flexibility of the flat cable is insufficient, and this is a factor in preventing the disassembly of this type of liquid crystal display device. Therefore, there is a problem that the connection portion between the flat cable and the liquid crystal display panel or the flat cable itself is easily broken.

In addition, the flat cable is connected to the liquid crystal display panel by OLB (Outer Lead Bonding), and thus the thin parts of the glass constituting the liquid crystal panel are many, so that it is easily broken.

SUMMARY OF THE INVENTION

The present invention has been implemented in view of the foregoing situation, and has an object to provide a planar display device that can be easily disassembled without breaking respective parts while keeping the function of integrally holding a first planar display panel and a second planar display panel which are arranged so as to face opposite directions.

According to the present invention, a planar display device is equipped with a first planar display panel, a first frame for supporting the first planar display panel, a second planar display panel and a second frame that supports the second planar display panel and is detachably attached to the first frame so that the second planar display panel is disposed so as to face the opposite side to the first planar display panel. By assembling the first frame supporting the first planar display panel and the second frame supporting the second planar display panel, the first planar display panel and the second planar display panel can be arranged and held so as to face the opposite sides to each other, and by separating the first frame and the second frame from each other, each planar display panel can be easily separated at every part of the frame. Therefore, the planar display device can be easily disassembled without breaking each part constituting the planar display device, and workability for repair or recovery can be enhanced.

DETAILED DESCRIPTION OF THE PREFERRED EMBODIMENT

An embodiment of the present invention will be described hereunder with reference to the accompanying drawings.

Figure 1:
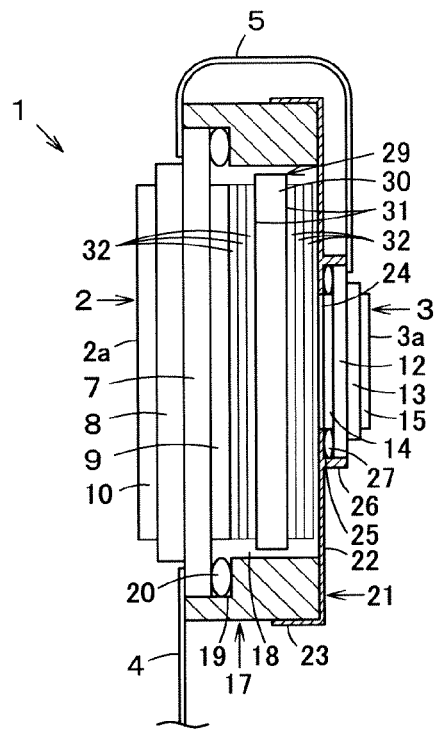
FIG. 1 is a cross-sectional view showing an assembly state of a planar display device according to an embodiment of the present invention.
Figure 2:
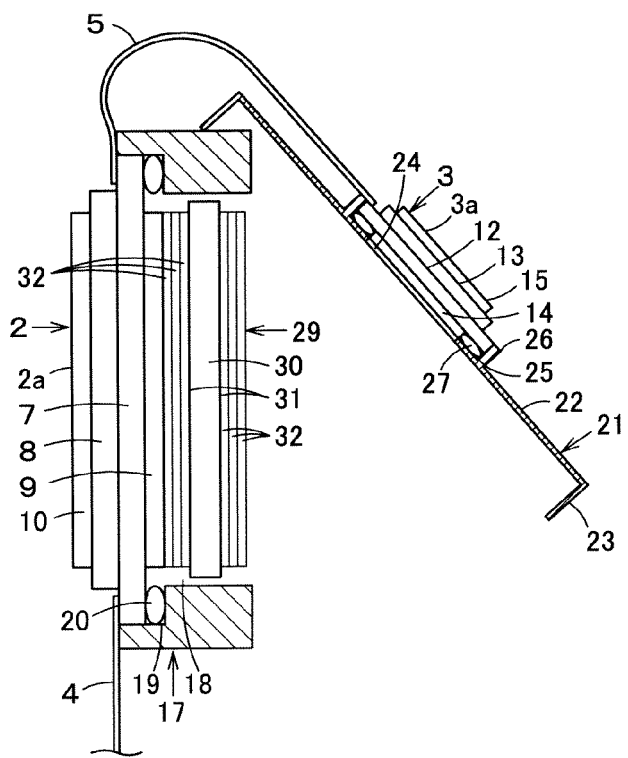
FIG. 2 is a cross-sectional view showing a disassembly process of the planar display device.

In FIG. 1 and FIG. 2, reference numeral 1 represents a liquid crystal display device as a planar display device. The liquid crystal display device 1 is used for a cellular phone or the like, for example, and includes a main liquid crystal display panel 2 as a substantially rectangular flat plate type first planar display panel, and a sub liquid crystal display panel 3 as a substantially rectangular flat plate type second planar display panel smaller than the main liquid crystal display panel 2. Rectangular display areas 2a and 3a for displaying images are formed at the center portions on the surfaces as principal surfaces of the main and sub liquid crystal display panels 2 and 3.

The main and sub liquid crystal displays 2 and 3 are continuously connected to an unillustrated driving circuit board by driving flat cables 4 and 5 such as an FPC (Flexible Print Circuit), a COF (Chip On Film) or the like, thereby forming a main-sub integral type liquid crystal display panel.

The main liquid crystal display panel 2 has a rectangular flat plate type array board 7 having unillustrated thin film transistors (TFT), transparent pixel electrodes (ITO), etc., arranged in a matrix form on a glass substrate as an insulating substrate. A rectangular flat plate type counter board 8 having an unillustrated counter electrode formed thereon is attached to the surface side of the array board 7 so as to face the surface side of the array board 7. Unillustrated liquid crystal is interposed and sealed between the array board 7 and the counter board 8. Optical sheets 9 and 10 for optically varying light transmitted through the array board 7 and the counter board 8 are attached to the outer surfaces of the array board 7 and the counter board 8, respectively. The dimensions of the array board 7 are larger than that of the counter board 8, and one end of each of the flat cables 4 and 5 is connected to each of the upper and lower portions corresponding to both end portions of the array board 7 in the longitudinal direction of the flat cables 4 and 5.

The sub liquid crystal display panel 3 is constructed in the same manner as the main liquid crystal display panel 2, that is, it is equipped with a rectangular flat plate type array board 12 having unillustrated thin film transistors (TFT), transparent pixel electrodes (ITO), etc., arranged in a matrix form on a glass substrate as an insulating substrate. A rectangular flat plate type counter board 13 having an unillustrated counter electrode formed thereon is attached to the surface side of the array board 12 so as to face the surface side of the array board 12. Unillustrated liquid crystal is interposed and sealed between the array board 12 and the counter board 13. Optical sheets 14 and 15 for optically varying light transmitted through the array board 12 and the counter board 13 are attached to the outer surfaces of the array board 12 and the counter board 13. The dimensions of the array board 12 are larger than that of the counter board 13, and the other end of the flat cable 5 connected to the main liquid crystal display panel 2 is connected to the upper portion corresponding to one end portion of the array board 12.

Furthermore, the liquid crystal display device 1 is equipped with a frame 17 as a first frame for supporting the main liquid crystal display panel 2. The frame 17 is formed of synthetic resin and designed as a rectangular frame, and a substantially rectangular housing portion 18 is opened at the center area thereof. A groove portion 19 in which the peripheral edge portion of the array board 7 of the main liquid crystal display panel 2 is fitted is formed at the inner peripheral edge portion of one surface side of the frame 17. The peripheral edge portion of the back surface of the array board 7 of the main liquid crystal panel 2 is adhesively fixed to the groove portion 19 by an adhesive member 20 such as peelable double-sided adhesive tape, adhesive agent or the like, for example.

Furthermore, the liquid crystal display device 1 is equipped with a bezel 21 as a second frame which supports the sub liquid crystal display panel 3 and is detachably attached to the other surface side of the frame 17. The bezel 21 is formed of elastically deformable metal, and has an attachment surface portion 22 disposed so as to cover the other surface side of the frame 17 and an attachment piece portion 23 which is attached so as to fit to the periphery of the frame 17 from the edge portion of the attachment surface portion 22. An opening portion 24 whose size corresponds to at least the size of the display area 3a of the sub liquid crystal display panel 3 is formed at the center of the attachment surface portion 22, and a fitting portion 26 forming a groove portion 25 in which the peripheral edge portion of the array board 12 of the sub liquid crystal display panel 3 is fitted is formed at the edge portion of the opening portion 24 so as to project from the edge portion of the opening portion 24. The peripheral edge portion of the back surface of the array board 12 of the sub liquid crystal display panel 3 is adhesively fixed to the groove portion 25 by an adhesive member 27 such as peelable double-sided adhesive tape, adhesive agent or the like.

By assembling the frame 17 supporting the main liquid crystal display panel 2 and the bezel 21 supporting the sub liquid crystal display panel 3, the main liquid crystal display panel 2 and the sub liquid crystal display panel 3 are arranged so as to face opposite sides. The flat cable 5 for connecting the main liquid crystal display panel 2 and the sub liquid crystal display panel 3 is disposed so as to be bent at the upper side corresponding to one end side of each of the frame 17 and the bezel 21.

Furthermore, a backlight 29 as a planar light source for irradiating planar light from the back surface sides of the liquid crystal display panels 2 and 3 is disposed inside the frame 17. That is, the backlight 29 is held between the frame 17 and the bezel 21 and disposed between the main liquid crystal display panel 2 and the sub liquid crystal display panel 3.

The backlight 29 has a substantially rectangular flat plate type light guide plate 30 formed of acrylic material, for example, and an unillustrated light source such as a light emitting diode or the like for irradiating light is disposed so as to face the incident surface at one side of the light guide plate 30. Furthermore, light emitting surfaces 31 from which the light incident from the light source into the light guide plate 30 is emitted are formed on both surfaces of the light guide plate 30 which face the respective liquid crystal display panels 2 and 3.

A plurality of (for example, three) rectangular sheet type optical sheets 32 for optically varying planar light emitted from each light emitting surface 31 are laminated and attached to each of the light emitting surfaces 31 of the light guide plate 30.

The planar light emitted from both light emitting surfaces 31 of the backlight 29 is irradiated to the back surface sides of the display areas 2a and 3a of the liquid crystal display panels 2 and 3, and transmitted through the display areas 2a and 3a of the liquid crystal display panels 2 and 3.

Next, the operation of the liquid crystal display device 1 will be described.

Under the assembly state of the liquid crystal display device 1, as shown in FIG. 1, the backlight 29 is disposed inside the frame 17, the frame 17 to which the main liquid crystal display panel 2 is attached and the bezel 21 to which the sub liquid crystal display panel 3 is attached are combined with each other, and the display area 2a on the surface of the main liquid crystal display panel 2 and the display area 3a on the surface of the sub liquid crystal display panel 3 are arranged so as to face opposite sides while the main liquid crystal display panel 2 and the sub liquid crystal display panel 3 are arranged back to back. The backlight 29 is held between the frame 17 and the bezel 21, and disposed between the main liquid crystal display panel 2 and the sub liquid crystal display panel 3. The flat cable 5 for connecting the main liquid crystal display panel 2 and the sub liquid crystal display panel 3 is disposed so as to be bent at one end side, that is, the upper portion side, of the frame 17 and the bezel 21.

When the liquid crystal display device 1 is disassembled, the frame 17 and the bezel 21 are first separated from each other as shown in FIG. 2. At this time, the lower portion side of the bezel 21 which corresponds to the opposite side to the upper portion side as the one end side of the bezel 21 from which the flat cable 5 is drawn out is detached from the frame 17, whereby the bezel 21 can be easily separated from the frame 17 without applying any unreasonable load on the flat cable 5.

The main liquid crystal display panel 2 is peeled off from the disassembled frame 17. At this time, by elastically deforming the frame 17, the main liquid crystal display panel 2 is enabled to be easily peeled off from the frame 17, and thus it can be easily separated without applying any unreasonable load to the main liquid crystal display panel 2 itself or the connection portions of the flat cables 4 and 5 connected to the main liquid crystal display panel 2 and thus breaking these portions.

The sub liquid crystal display panel 3 is peeled off and separated from the separated bezel 21. At this time, by elastically deforming the bezel 21, the sub liquid crystal panel 3 can be easily peeled off from the bezel 21, and thus it can be easily separated without applying any unreasonable load to the sub liquid crystal display panel 3 itself or the connection portions of the flat cable 5 connected to the sub liquid crystal display panel 3 and thus breaking these portions.

As described above, according to the liquid crystal display device 1, by assembling the frame 17 supporting the main liquid crystal display panel 2 and the bezel 21 supporting the sub liquid crystal display panel 3 with each other, the main liquid crystal display panel 2 and the sub liquid crystal display panel 3 can be arranged and held so as to face opposite sides, and also by separating the frame 17 and the bezel 21 from each other, each liquid crystal display panel 2, 3 can be easily separated at every part of the frame 17 and bezel 21. Accordingly, the liquid crystal display device 1 can be easily disassembled without breaking any part such as the liquid crystal display panels 2 and 3, the flat cables 4 and 5, etc., constituting the liquid crystal display device 1, and the workability for repair and recovery can be enhanced.

Furthermore, by assembling the frame 17 and the bezel 21, the backlight 29 disposed between the main liquid crystal display panel 2 and the sub liquid crystal display panel 3 can be positioned and held between the frame 17 and the bezel 21.

Still furthermore, by using the metal bezel 21 as the second frame for supporting the sub liquid crystal display panel 3, the assembling/separating performance to/from the frame 17 can be enhanced, and the liquid crystal display device can be miniaturized even when it has a frame division structure.

The backlight 29 may be divided into two parts for the main liquid crystal display panel 2 and the sub liquid crystal display panel 3, respectively.

Furthermore, the planar display device is not limited to the liquid crystal display device 1, and it may be applied to an organic EL display device, etc.

What is claimed is:

1. A planar display device comprising:
    a first planar display panel including a first display surface on its surface;
    a first frame for supporting the first planar display panel to face in a first direction;
    a second planar display panel including a second display surface on its surface;
    a second frame that supports the second planar display panel and is detachably attached to the first frame so that the second display surface of the second planar display panel is disposed so as to face in an opposite direction as the first display surface of the first planar display panel; and
    a flat cable for connecting the first planar display panel and the second planar display panel, and the flat cable is disposed to be bent; and
    a planar light source held between the first frame and the second frame and disposed between the first planar display panel and the second planar display panel having the first and second display surfaces facing opposite directions from each other.

2. The planar display device according to claim 1, wherein the second frame is a metal bezel that is attached to the first frame so as to be detachably fitted to the first frame.

3. The planar display device according to claim 1, wherein the first planar display panel and the second planar display panel are liquid crystal display panels.

4. The planar display device according to claim 1, wherein the planar light source includes a light guide plate having light emitting surfaces on both surfaces thereof so as to face the first planar display panel and the second planar display panel, and a light source for making light incident to the light guide plate.

5. The planar display device according to claim 1, wherein the first planar display panel is configured to be disassembled from the first frame and the second panel is configured to be disassembled from the second frame, when the first and second frames are detached from each other.

6. The planar display device according to claim 5, wherein the first frame is deformable to disassemble the first planar display panel from the first frame by peeling the first planar display panel from the first frame, and the second frame is deformable to disassemble the second planar display panel from the second frame by peeling the second planar display panel from the second frame.

* * * * *